April 30, 1929.  I. J. REMARK  1,711,460
COLLAPSIBLE CORE
Filed June 10, 1925   2 Sheets-Sheet 1
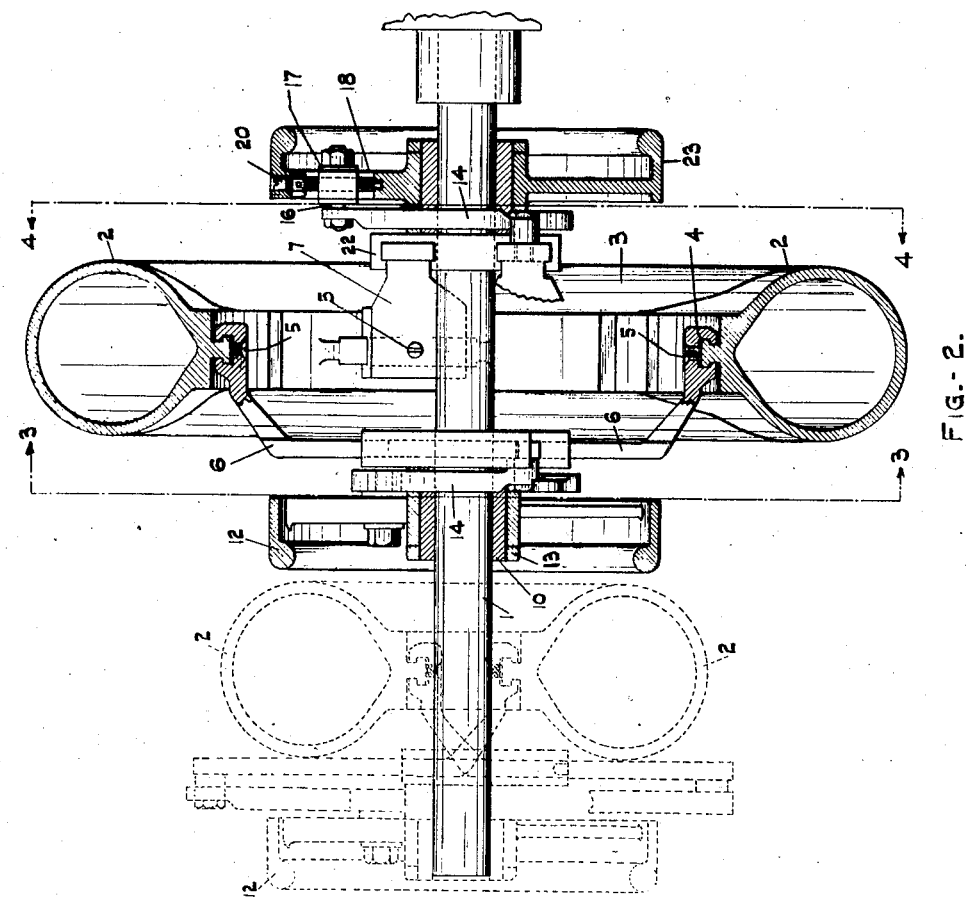
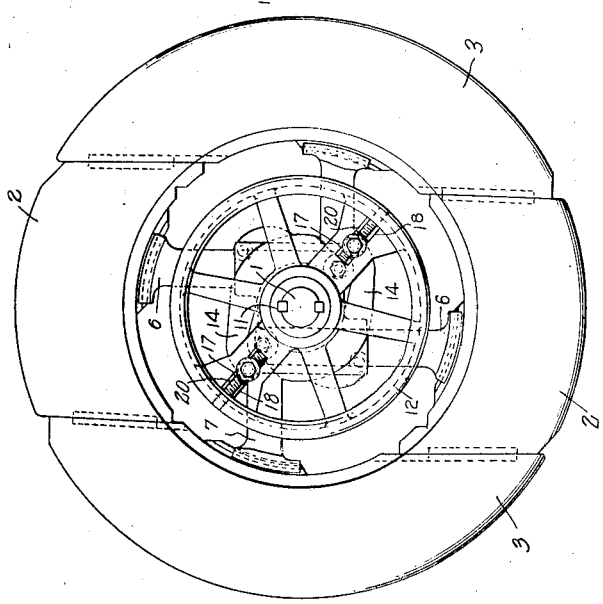
*INVENTOR.*
ISIDORE J. REMARK.
BY
*ATTORNEY.*

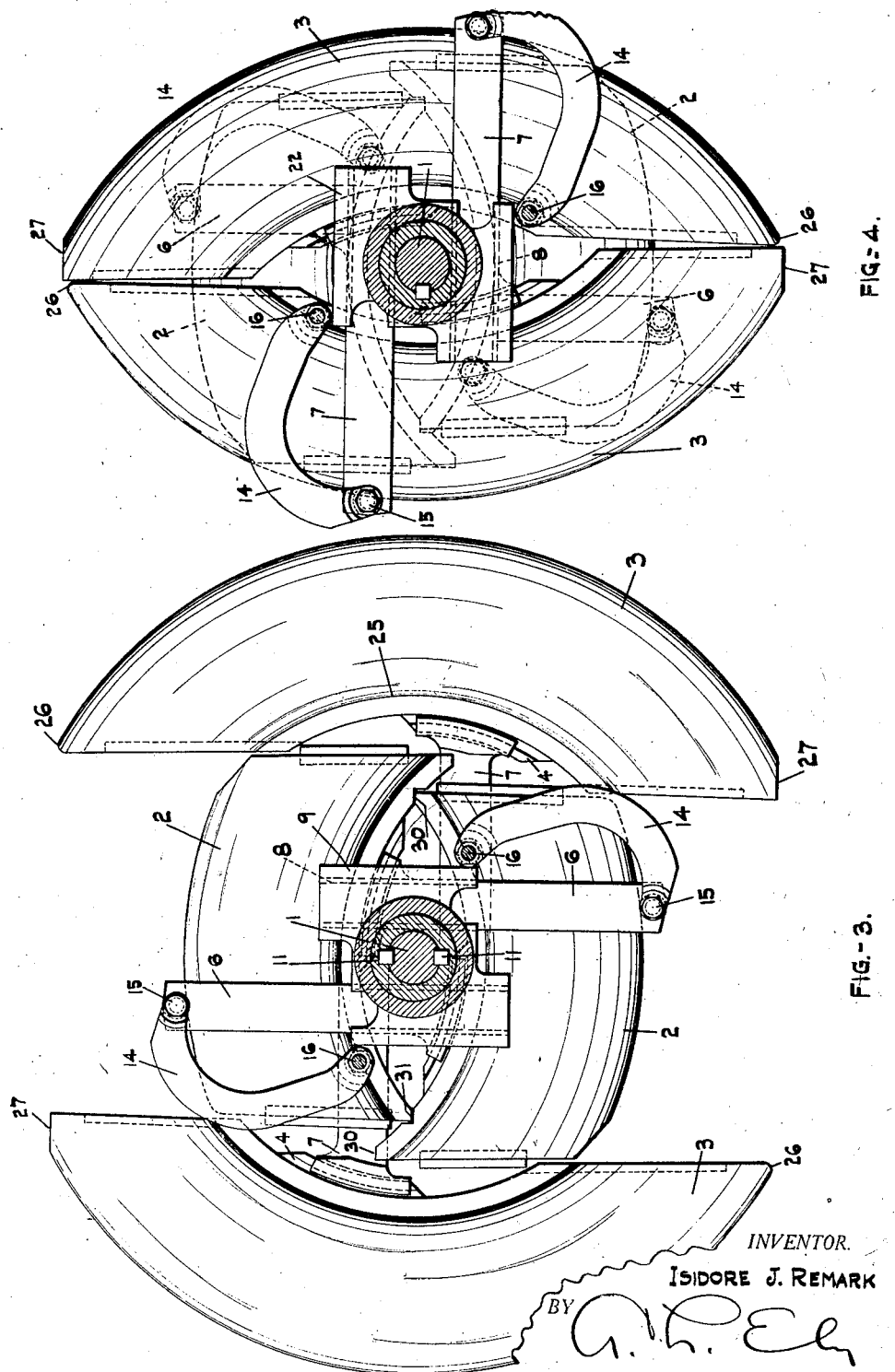

Patented Apr. 30, 1929.

1,711,460

UNITED STATES PATENT OFFICE.

ISIDORE J. REMARK, OF AKRON, OHIO, ASSIGNOR TO THE GENERAL TIRE & RUBBER COMPANY, OF AKRON, OHIO, A CORPORATION OF OHIO.

COLLAPSIBLE CORE.

Application filed June 10, 1925. Serial No. 36,118.

This invention relates to collapsible tire building cores of the type in which the core is associated with a collapsing mechanism by which it may be withdrawn from within the finished tire. Devices of this type are well known, and it is the object of the present invention to construct a core for use in the manufacture of tires of small internal or bead diameter and large cross-section. The core shown herein is designed to collapse easily and quickly into a very restricted area. For this reason the core is constructed so that the collapsing mechanism is entirely removed from the plane of the core and the full inner circumference of the bead is available for manipulation of the sections. The various core sections are also cut away slightly so as to permit the bead to be passed over the sections.

One form of the invention is illustrated and described, it being understood that changes and modifications may be made within the scope of the invention and the claims hereto apended.

In the drawings:

Figure 1 is a side elevation of the core in assembled condition;

Figure 2 is a transverse section of the core along the shaft;

Figure 3 is a section on the line 3—3 of Figure 2 with the first or key sections withdrawn; and Figure 4 is a section on the line 4—4 of Figure 2 with the intermediate sections withdrawn.

In the drawings, the shaft of the tire machine is indicated by the numeral 1 and is of sufficient length to permit the sections which are first withdrawn from the core to be shifted outwardly to clear the intermediate sections.

The key or wedge sections, two in number, are indicated by the numerals 2 and are placed opposite to one another. The intermediate sections are indicated by the numerals 3, the four sections named constituting the complete tire building core. The sections are formed with T-shaped projections 4 upon their inner peripheries which are arranged to be clamped by set screws 5 within correspondingly shaped grooves in the outer extremities of guide arms 6 and 7, the numeral 6 indicating the guide arms for the key sections and the numeral 7 indicating the guide arms for the intermediate sections. The guide arms are bent outwardly and then are formed with sections parallel to the plane of the core, the arms for the sections being oppositely placed as shown in Figure 2. In this manner the entire space within the central plane of the core is left free and unoccupied by any of the collapsing mechanism and the core sections can be moved inwardly until they rest upon the shaft 1, thus obtaining a maximum contraction of the core.

The vertical portions of the arms 6 are slidably mounted in parallel guides 8 formed upon a plate 9 and at either side of the shaft 1. The plate 9 is provided with a sleeve 10 and is slidably but non-rotatively mounted upon the shaft 1 by means of parallel keys 11. Upon the sleeve 10 is rotatively mounted the hand-wheel 12 secured in position upon the sleeve by a collar 13. The hand wheel constitutes operating means for withdrawing the key sections from the tire and for this purpose is connected to each section by a curved link 14, one end of which is pivoted upon a stud 15 carried upon the lower end of the arm 6, the links being curved so as to clear the core shaft when the core is in assembled position. The outer end of each link is pivoted upon a stud 16 which is formed upon an adjustable block 17 mounted in a radial slot 18 formed in the hand wheel 12. The block 17 is adjusted toward and from the center of the hand wheel by a set screw 20, this arrangement permitting an adjustment of the pivot point of the arm, so that the collapsing mechanism may be used with different sizes of cores. Both links are connected at opposite sides of the hand wheel, so that when the wheel is revolved the key sections are withdrawn toward the center of the core and until they rest upon the shaft. The sleeve 10 is then shifted forwardly of the shaft to the dotted line position shown in Figure 2 and the intermediate sections are withdrawn, whereupon the tire can be stripped from the core.

The intermediate sections 3 are withdrawn from the tire in the same manner as the key sections, the arms 7 being supported for sliding movement in the guideways on the plate 22 which is fixed to the shaft 1. The hand wheel 23 for operating the intermediate sections is connected to these sections by links 14 in the same manner as the key sections and it is unnecessary to describe this construction further.

In order to strip the tire from the core, the outer periphery of the core in collapsed position should be within the bead line, indicated at 25, and with this arrangement of the core as shown and described, a maximum inward movement of the core sections is obtained. In every large section the outer corners of certain of the sections may be removed and the core will operate satisfactorily for the building of tires, and this has been taken advantage of by rounding off one corner of each section, as at 26, and cutting away of the other corner, as at 27. This enables the tire to clear the corners of the core sections, as indicated in Figure 3. It will also be observed that the key sections are not positioned directly opposite one another, but are positioned laterally or in echelon so that the points of the core do not abut when in collapsed position, but pass beyond each other, and these sections may be brought down upon the shaft to the full extent. The key sections are provided with squared shoulders 30 and notches 31 so that they mate as shown in Figure 3. This makes the core very compact when in collapsed position.

What is claimed is:

1. In a collapsible core construction, sections positioned upon opposite sides of the core axis and movable toward the axis of the core, the sections being placed in echelon.

2. In a collapsible core construction, sections positioned upon opposite sides of the core axis, and means to move the sections toward and from the core axis, the sections being positioned laterally with respect to each other so that inner points of one section may pass beyond the inner points of the other section.

3. A collapsible core divided into a plurality of sections, two of said sections on opposite sides of the core axis being wedge sections, and means to draw the wedge sections toward the axis of the core, the wedge sections being arranged in echelon.

4. A collapsible core divided into a plurality of sections, two of said sections on opposite sides of the core being movable simultaneously toward and from the axis of the core, a guiding plate for the sections secured to the shaft and located outside of the plane of the core and having guideways formed therein parallel to the plane of the core, and parallel, non-aligned guiding arms attached to the sections and having portions offset therefrom and movable in the guideways.

5. A collapsible core divided into a plurality of sections, two of said sections on opposite sides of the core shaft being wedge sections, a supporting plate upon the core shaft, said plate having guideways formed therein parallel to the plane of the core, guiding arms for the sections, the supporting plate being located outside of the core plane, the guiding arms having lateral extensions fastened to the sections and having straight non-aligned portions slidably received in the guideways.

6. A collapsible core divided into a plurality of sections, two of said sections on opposite sides of the core shaft being wedge sections, a supporting plate upon the core shaft and guiding arms for the sections, the supporting plate being located outside of the core plane, and guiding arms having lateral extensions fastened to the sections and having straight portions slidably received in the supporting plate, said straight portions passing upon opposite sides of the shaft.

7. A collapsible core divided into a plurality of sections, two of said sections on opposite sides of the core shaft being wedge sections, a supporting plate upon the core shaft and guiding arms for the sections, the supporting plate being located outside of the core plane, and guiding arms having lateral extensions fastened to the sections and having straight portions slidably received in the supporting plate, the sections being placed in echelon.

8. A collapsible core divided into a plurality of sections, two of said sections on opposite sides of the core shaft being wedge sections, a supporting plate upon the core, shaft and guiding arms for the sections, the supporting plate being located outside of the core plane, and guiding arms having lateral extensions fastened to the sections and having straight portions slidably received in the supporting plate, said straight portions passing upon opposite sides of the shaft, the sections being placed in echelon.

9. A collapsible core comprising a plurality of sections; two of said sections constituting key sections placed on opposite sides of the core axis, a guiding plate for said key sections located at one side of the core plane, a guiding plate for the other sections of the core located on the opposite side of the core plane, and an arm secured to each core section and slidably received in the plates, the arms connected to each pair of core sections being parallel but non-aligned with respect to each other and passing upon opposite sides of the core axis.

10. A collapsible core comprising a core shaft, a plurality of sections arranged in pairs upon opposite sides of the core shaft, guiding plates for the sections, and arms attached to the sections and slidably received in the plates, the plates being spaced apart on opposite sides of the core plane and the arms being parallel, the arms of each pair passing upon the opposite sides of the core axis.

11. A collapsible core comprising a plurality of sections, two of said sections constituting key sections located upon opposite sides of the core axis, a guiding plate for the key sections, arms attached to the key sections slidably received in the plate, a guiding plate for the remaining sections, and arms attached to the remaining sections and slidably received in the last named plate, the said plates being spaced apart on either side of the central core plane, the key sections being laterally positioned with respect to one another so that the points of one key section will pass within the points of the other key section.

12. A collapsible core comprising a section, which is movable toward and from the axis of the core, an arm rigidly connected to the section and extending toward the core axis, a rotatable hand wheel, and a link connected to the hand wheel and the end of the arm remote from the core section, the link being curved so as to clear the core shaft.

13. A collapsible tire building core comprising a plurality of sections which constitute a complete core, the outer portion of a section at an end thereof being permanently removed for the purposes set forth.

14. A collapsible tire building core comprising a plurality of sections which constitute a complete core, each core section at an end thereof being cut away upon its outer periphery for the purposes set forth.

15. A collapsible core comprising a section movable toward and from the core axis, a rotatable hand wheel, a block adjustable radially of the hand wheel, and a link pivoted to the core section and to the block.

16. A collapsible core comprising a plurality of sections, and arms for supporting said sections, the inner peripheries of the sections having projections with enlarged heads fastened within corresponding grooves in the arms.

ISIDORE J. REMARK.